United States Patent
Baughman et al.

(10) Patent No.: US 10,409,291 B2
(45) Date of Patent: Sep. 10, 2019

(54) TEAMING IN SWARM INTELLIGENT ROBOT SETS

(71) Applicant: International Business Machines Corporation, Armonk, NY (US)

(72) Inventors: Aaron K. Baughman, Silver Spring, MD (US); David C. Bastian, Addison, IL (US); Nicholas A. McCrory, Sacramento, CA (US); Todd R. Whitman, Bethany, CT (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 15/469,635

(22) Filed: Mar. 27, 2017

(65) Prior Publication Data

US 2018/0275679 A1  Sep. 27, 2018

(51) Int. Cl.
*G05B 19/418* (2006.01)
*G05D 1/02* (2006.01)
(Continued)

(52) U.S. Cl.
CPC .......... *G05D 1/0291* (2013.01); *B25J 9/162* (2013.01); *B25J 9/1661* (2013.01); *B25J 9/1669* (2013.01);
(Continued)

(58) Field of Classification Search
CPC combination set(s) only.
See application file for complete search history.

(56) References Cited

U.S. PATENT DOCUMENTS

| 6,463,360 B1 * | 10/2002 | Terada | B25J 9/1679 318/568.12 |
| 7,343,222 B2 * | 3/2008 | Solomon | F41H 13/00 318/568.11 |

(Continued)

OTHER PUBLICATIONS

Schneider-Fontan et al. Territorial multi-robot task division Robotics and Automation, IEEE Transactions on vol. 14, Issue 5, Oct. 1998 pp. 815-822 Digital Object Identifier 10.1109/70.720357 (Year: 1998).*

(Continued)

*Primary Examiner* — Khoi H Tran
*Assistant Examiner* — Jorge O Peche
(74) *Attorney, Agent, or Firm* — Steven M. Greenberg, Esq.; Shutts & Bowen LLP

(57) ABSTRACT

Embodiments of the present invention provide a method, system and computer program product for teaming in swarm intelligent robot sets. The method includes programming a multiplicity of robots in a multi-robot set with a particular locomotive model and assigning each of the robots to different individual tasks corresponding to different individual objectives of a problem based upon the particular locomotive model of the corresponding robots. The method additionally includes deploying the multi-robot set into a confined geographic area and surveilling each robot to ensure that each robot assigned to a corresponding task is achieving the assigned task. Finally, the method includes responding to one of the robots appearing to be unable to complete a corresponding assigned one of the tasks by selecting a different robot with a locomotive model considered compatible with the corresponding assigned one of the tasks to complete the corresponding assigned one of the tasks.

15 Claims, 2 Drawing Sheets

(51) Int. Cl.
*G06K 9/00* (2006.01)
*G05D 1/00* (2006.01)
*B25J 9/16* (2006.01)
*B25J 13/00* (2006.01)
*G06Q 10/00* (2012.01)

(52) U.S. Cl.
CPC .......... *B25J 13/006* (2013.01); *G05D 1/0027* (2013.01); *G05D 1/0221* (2013.01); *G05D 1/0246* (2013.01); *G05D 1/0297* (2013.01); *G06K 9/00664* (2013.01); *G06Q 10/00* (2013.01); *G05B 2219/39146* (2013.01)

(56) References Cited

U.S. PATENT DOCUMENTS

| | | | | |
|---|---|---|---|---|
| 9,008,839 | B1* | 4/2015 | Kuffner, Jr. | B25J 9/0084 700/248 |
| 9,024,771 | B1* | 5/2015 | Kuffner, Jr. | G08B 21/18 340/679 |
| 9,043,021 | B1* | 5/2015 | Clark | G06F 16/2365 700/248 |
| 9,821,455 | B1* | 11/2017 | Bareddy | B25J 9/0084 |
| 10,012,996 | B1* | 7/2018 | Canoso | G05D 1/0212 |
| 2005/0256610 | A1* | 11/2005 | Orita | G05D 1/0088 700/248 |
| 2016/0280370 | A1* | 9/2016 | Canavor | B64C 39/024 |
| 2016/0280371 | A1* | 9/2016 | Canavor | B64C 39/024 |
| 2016/0285863 | A1* | 9/2016 | Canavor | H04L 63/0823 |
| 2017/0282374 | A1* | 10/2017 | Matula | B25J 11/008 |
| 2018/0253093 | A1* | 9/2018 | Augugliaro | G05D 1/0027 |

OTHER PUBLICATIONS

Parker, Lynne E., "Multiple Mobile Robot Systems," Mobile and Distributed Robotics (Part E), Springer Handbook of Robotics, 2008.

Baldassarre, et al., "Distributed Coordination of Simulated Robots Based on Self-Organisation," Institute of Cognitive Sciences and Technologies, Rome, Italy, Feb. 2006.

* cited by examiner

TEAMING IN SWARM INTELLIGENT ROBOT SETS

BACKGROUND OF THE INVENTION

Field of the Invention

The present invention relates to artificially intelligent collections of robots and more particularly to robotic swarming.

Description of the Related Art

Robotics refers to the interdisciplinary branch of engineering and science that includes mechanical engineering, electrical engineering, computer science, and others and address the design, construction, operation, and use of robots, as well as computer systems for the control, sensory feedback, and information processing in a robot. The aggregation of the foregoing technologies ultimately may be used to develop machines that can substitute for humans. Initially, single robot systems were developed to perform very specific tasks and in many cases, included a mere articulating art with a tool disposed thereon such that the movement arm could be programmatically coordinated yet autonomous in that the arm could respond to sensed conditions.

More recently, multi-robot systems have come of age where in a multiplicity of different robots operate in a coordinated fashion to achieve a specific goal. Swarm robotics is a new approach to the coordination of a multi-robot system that involves large numbers of simple physical robots. Swarm robotics capitalizes upon artificial swarm intelligence so as to produce a desired collective behavior from the interactions between the simple physical robots and interactions of the simple physical robots with the surrounding environment. In swarm robotics, the individual robots follow very simple rules, and although there is no centralized control structure dictating how individual robots should behave, local, and to a certain degree random, interactions between the robots lead to the emergence of "intelligent" global behavior, unknown to the individual robots.

BRIEF SUMMARY OF THE INVENTION

Embodiments of the present invention address deficiencies of the art in respect to swarm robotics and provide a novel and non-obvious method, system and computer program product for teaming in swarm intelligent robot sets. In an embodiment of the invention, a method of teaming in swarm intelligent robot sets includes programming a multiplicity of robots in a multi-robot set with a particular locomotive model and assigning each of the multiplicity of robots to different individual tasks corresponding to different individual objectives of a problem based upon the particular locomotive model of the corresponding robots. The method additionally includes deploying the multi-robot set into a confined geographic area and surveilling each robot to ensure that each robot assigned to a corresponding one of the different tasks is achieving the assigned one of the tasks. Finally, the method includes responding to one of the robots in the multi-robot set appearing to be unable to complete a corresponding assigned one of the tasks, by selecting a different one of the robots in the multi-robot set with a locomotive model considered compatible with the corresponding assigned one of the tasks to complete the corresponding assigned one of the tasks.

In one aspect of the embodiment, the locomotive model of the one of the robots is modified with the locomotive model of the selected different one of the robots. In another aspect of the embodiment, the robots of the multi-robot set are communicatively linked to one another over a wireless computer communications network and each surveils at least one other of the robots in the multi-robot set to ensure that the surveilled other robot assigned to a corresponding one of the different tasks is achieving the assigned one of the tasks. In yet another aspect of the embodiment, the method additionally includes responding to one of the robots in the multi-robot set appearing to be unable to complete a corresponding assigned one of the tasks by re-assigning each of the multiplicity of robots to the different individual tasks corresponding to the different individual objectives of a problem based upon the particular locomotive model of the corresponding robots and in consideration of the inability of the one of the robots in the multi-robot set appearing to be unable to complete the corresponding assigned one of the tasks.

In even yet another aspect of the embodiment, each of the multiplicity of robots is assigned to different individual tasks corresponding to different individual objectives of a problem based upon the particular locomotive model of the corresponding robots utilizing a genetic algorithm in consideration of a population of a candidate set of possible assignments, and wherein ones of the multiplicity of robots are repeatedly re-assigned over time to other different individual tasks corresponding to the different individual objectives of the problem utilizing different iterations of the population of the candidate set of possible assignments.

In another embodiment of the invention, a swarm robotics data processing system is configured for teaming in swarm intelligent robot sets. The system includes a host computing platform that includes one or more computers each with memory and at least one processor. The system also includes a multiplicity of robots in a multi-robot set deployed in a confined geographic area and in wireless communication with the host computing platform. Each of the robots has at least one microprocessor, memory and a locomotive platform that includes one or more locomotive elements driven by a motor controlled by a controller coupled to the at least one microprocessor. Each of the robots additionally includes programming specifying a particular locomotive model defining a permissible range of movement of a corresponding one of the robots.

The system also includes a teaming module executing in memory of the host computing platform. The module includes program code that assigns each of the multiplicity of robots to different individual tasks corresponding to different individual objectives of a problem based upon the particular locomotive model of the corresponding robots, surveils each robot to ensure that each robot assigned to a corresponding one of the different tasks is achieving the assigned one of the tasks and responds to one of the robots in the multi-robot set appearing to be unable to complete a corresponding assigned one of the tasks by selecting a different one of the robots in the multi-robot set with a locomotive model considered compatible with the corresponding assigned one of the tasks to complete the corresponding assigned one of the tasks.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for teaming in swarm intelligent robot sets. In accordance with an embodiment of the invention, a set of robots in a multi-robot set are trained to perform different tasks. Then, a problem defined by multiple different objectives is assigned to the set of robots with each robot in the set addressing a specific task directed towards one of the objectives. Thereafter, each robot is deployed into a confined geographic space in communication with one another to perform a corresponding assigned task. Once deployed, the performance of the robots is surveilled and one of the robots is identified as failing to complete a corresponding task. In response, a different one of the robots is selected that demonstrates an ability to perform the corresponding task unable to be completed by the identified robot. The selected robot is then assigned to complete the corresponding task. Optionally, the locomotive model of the identified robot is then modified for consistency with a locomotive model of the selected robot so that the identified robot may learn from the selected robot.

Figure 1:
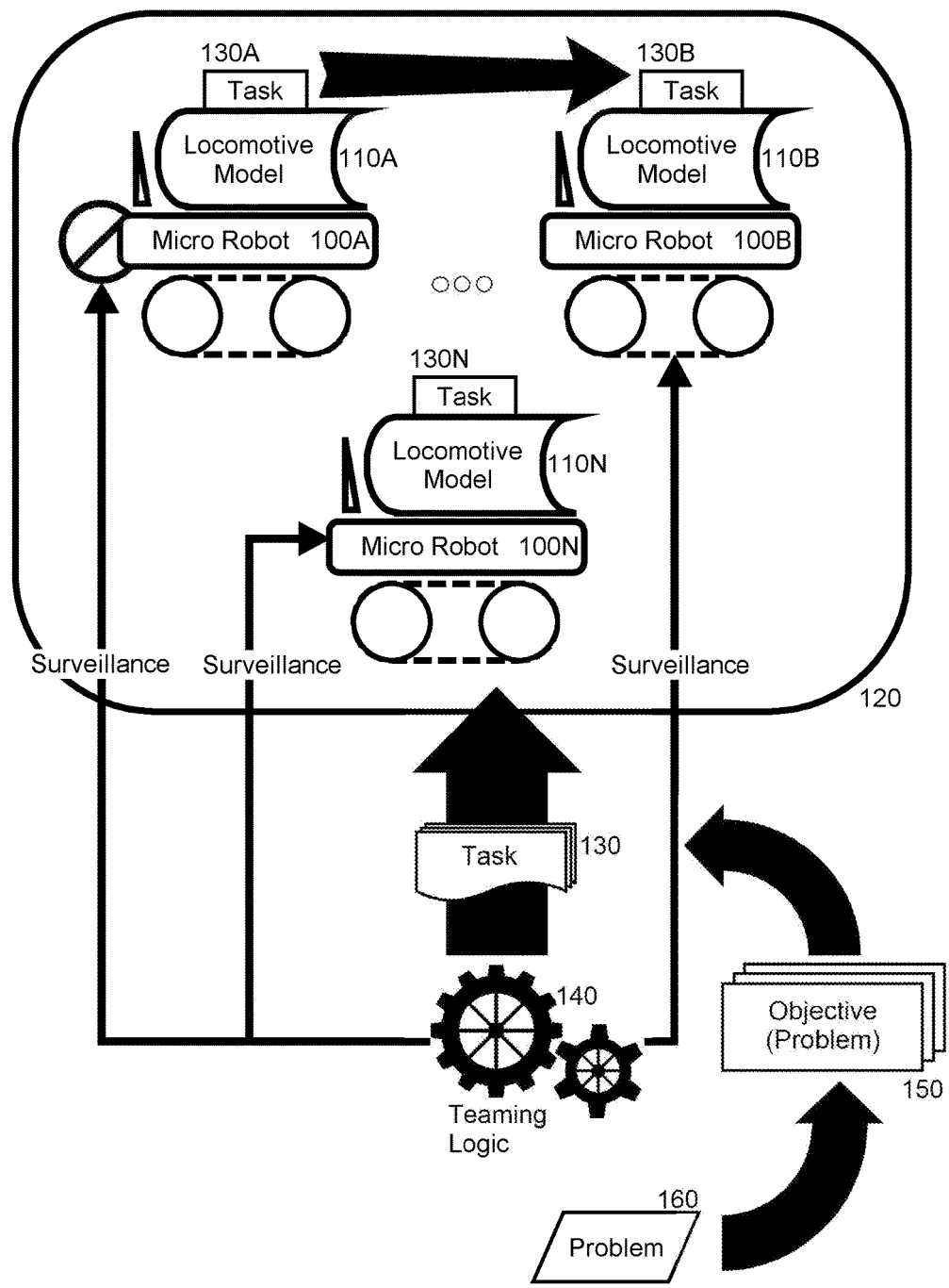
FIG. 1 is a pictorial illustration of a process for teaming in swarm intelligent robot sets.

In further illustration, FIG. 1 is a pictorial illustration of a process for teaming in swarm intelligent robot sets. As shown in FIG. 1, different micro robots 100A, 100B, 100N are each programmed with a corresponding locomotive model 110A, 100B, 110N defining different pre-programmed patterns of movement and capabilities of movement for a corresponding one of the micro robots 100A, 100B, 100N. Teaming logic 140 bounds a problem 160 relating to a confined geographic space 120 into a set of objectives 150 and correlates the objectives 150 to a set of tasks 130. The teaming logic 140 then assigns one or more of the tasks 130 to the set of the micro robots 100A, 100B, 100N in consideration of the locomotive model 110A, 110B, 110N of the micro robots 100A, 100B, 100N such that each of the micro robots 100A, 100B, 100N has assigned thereto, at least one corresponding task 130A, 130B, 130N consistent with its programmed locomotive model 110A, 110B, 110N. Thereafter, the micro robots 100A, 100B, 100N are deployed into a confined geographical space 120 in which to solve the problem 160.

Of note, the teaming logic 140 engages in the surveillance of each of the micro robots 100A, 100B, 100N. In this regard, the teaming logic 140 may directly surveil each individual one of the micro robots 100A, 100B, 100N. Alternatively, the teaming logic 140 may indirectly surveil each individual one of the micro robots 100A, 100B, 100N with each individual one of the micro robots 100A, 100B, 100N surveilling at least one other of the micro robots 100A, 100B, 100N in a peer-to-peer manner. In either circumstance, the teaming logic 140 is configured to detect an instance where a particular micro robot 100A amongst the micro robots 100A, 100B, 100N is observed as being unable to complete a corresponding task 130A assigned thereto.

More specifically, each of the micro robots 100A, 100B, 100N may acquire imagery of one or more other of the micro robots 100A, 100B, 100N from which image analysis may identify a pattern of movements of the surveilled one of the micro robots 100A, 100B, 100N. The pattern of movements of a surveilled one of the micro robots 100A, 100B, 100N may then be compared to a known optimal pattern of movements necessary to complete the corresponding task 130A, 130B, 130N assigned to the surveilled one of the micro robots 100A, 100B, 100N. To the extent that a task 130A assigned to one of the micro robots 100A is not complete and the one of the micro robots 100A is observed engaging in a pattern of movements different than the known optimal pattern of movements, the one of the micro robots 100A is then determined by the teaming logic 140 to be unable to complete the corresponding task 130A assigned thereto.

On condition that the surveillance of the teaming logic 140 reveals the inability of the micro robot 100A to complete its correspondingly assigned task 130A, the teaming logic 140 identifies a substitute one of the micro robots 100B, 100N with a locomotive model 110B, 110N compatible with the task 130A. In that instance, the teaming logic 140 re-assigns the task 130A to the identified substitute one of the micro robots 100B, 100N. As well, the locomotive model 110A of the micro robot 100A is then modified with respect to the locomotive model 110B, 110N of the substitute one of the micro robots 100B, 100N.

Once the micro robot 100A is determined during surveillance to have been unable to complete its correspondingly assigned task 130A, the teaming logic 140 may direct the substitute one of the micro robots 100B, 100N to mentor the micro robot 100A in completing the task 130A. In this regard, the micro robot 100A as a mentee is placed by the teaming logic 140 into an observation mode, while the mentoring one of the micro robots 100B, 100N is placed into a mentor mode. In the mentor mode, the mentoring one of the micro robots 100B, 100N performs the pattern of movements necessary to complete the task 130A. In the observation mode, the micro robot 100A acquires imagery of the movements of the mentoring one of the micro robots 100B, 100N and derives a pattern of movements from the acquired imagery. The mentoring one of the micro robots 100B, 100N then enters an observation mode and messages the micro robot 100A to enter a feedback mode in which the micro robot 100A repeats the observed pattern of movements.

While the micro robot 100A is in feedback mode, the mentoring one of the micro robots 100B, 100N acquires imagery of the micro robot 100A as the micro robot 100A performs the pattern of movements determined during the observation mode. The mentoring one of the micro robots 100B, 100N derives an observed pattern of movements of the micro robot 100A and compares the observed pattern to an optimal pattern for the task 130A. To the extent that the observed pattern does not deviate by a threshold amount from the optimal pattern for the task 130A, the mentoring one of the micro robots 100B, 100N messages the micro robot 100A to modify its corresponding locomotive model 130A to account for the pattern of movements learned from the mentoring one of the micro robots 100B, 100N. Otherwise, the mentoring one of the micro robots 100B, 100N messages the micro robot 100A to once again enter an observation mode to repeat the mentoring exercise.

Figure 2:
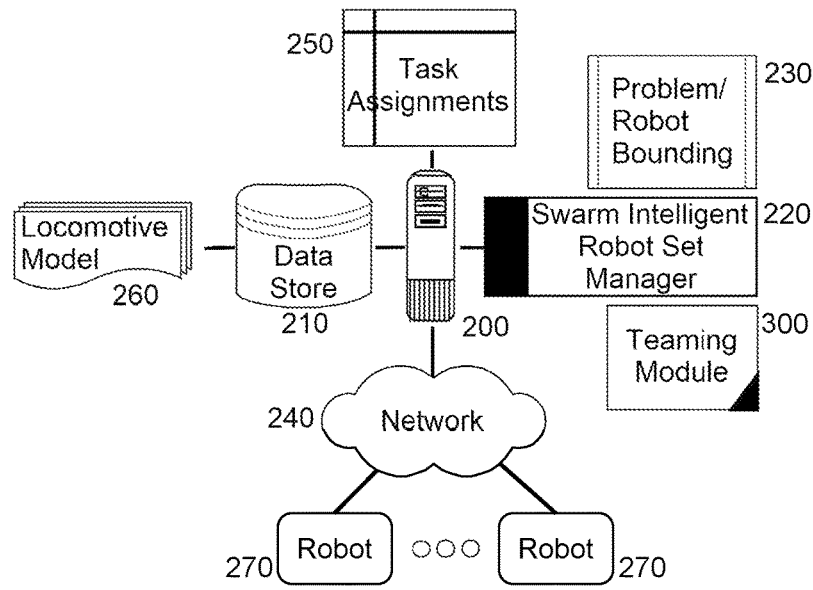
FIG. 2 is a schematic illustration of a swarm robotics data processing system configured for teaming in swarm intelligent robot sets; and, FIG. 3 is a flow chart illustrating a process for teaming in swarm intelligent robot sets.

The process described in connection with FIG. 1 may be implemented in a swarm robotics data processing system. In further illustration, FIG. 2 schematically shows a swarm robotics data processing system configured for teaming in swarm intelligent robot sets. The system includes a host computing system 200 that includes one or more computers, each with memory and at least one processor. The host computing system 200 includes fixed storage 210 and is communicatively coupled to a set of robots 270 over a wireless computer communications network 240. The host computing system 200 supports the operation of a swarm intelligent robot set manager 220 configured to program individual ones of the robots 270 with different locomotive models 260 in the data store 210.

The swarm intelligent robot set manager 220 includes program logic adapted to bound a provided problem in respect to a confined geographic space into a set of objectives—goals that may be achieved through the performance of a set of physical tasks assigned to each of the robots 270. The program logic additionally is adapted to then bind one or more of the tasks to respectively different ones of the robots 270 such that the locomotive model 260 for a given one of the robots 270 is compatible with each correspondingly assigned task. The program logic may then persist the task to robot assignments in a table 250 in memory of the host computing system 200.

Of note, a teaming module 300 may be coupled to the swarm intelligent robot set manager 220. The teaming module 300 includes program code that when executed in the memory of the host computing system 200, is enabled to surveil each of the robots 270 once deployed into the confined geographic space and to detect when one of the robots 270 deployed into the confined geographic space is unable to complete an assigned task. In that instance, the program code is enabled to identify a substitute one of the robots 270 able to perform the assigned task and to re-assign the task to the substitute one of the robots 270. As well, the program code modifies the locomotive model 260 of the one of the robots detected to have been unable to complete the task with the locomotive model 260 of the substitute one of the robots 270.

Figure 3:
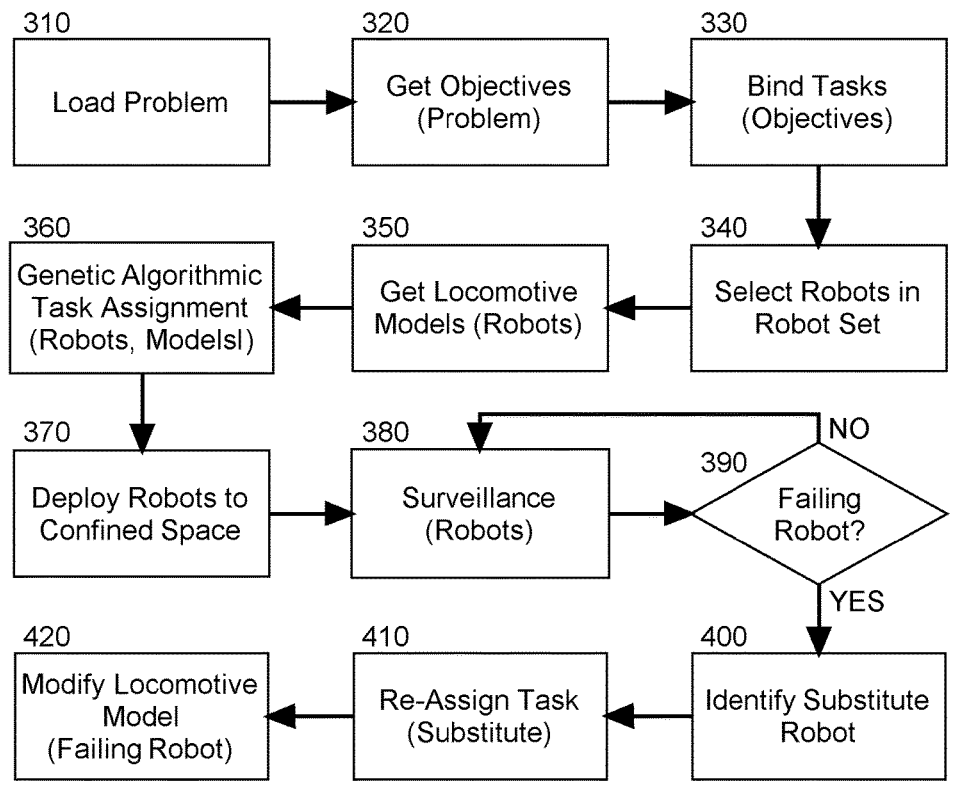

In even yet further illustration of the operation of the teaming module 300, FIG. 3 is a flow chart illustrating a process for teaming in swarm intelligent robot sets. Beginning in block 310, a problem is loaded into memory and the problem is bounded by a set of objectives in block 320. In block 330, each of the objectives is bounded to one or more tasks to be performed by an assigned robot in a set of robots. In block 340, a set of robots are selected for programming and in block 350, different locomotive models are assigned to different ones of the robots in the set.

Then, in block 360, a genetic algorithm is used to assign the bound tasks to selected ones of the robots such that the tasks assigned to each robot is able to be performed with respect to a correspondingly assigned locomotive model. In this regard, each of the robots is assigned one or more of the tasks in consideration of a population of a candidate set of possible assignments, and then the robots are repeatedly re-assigned over time to other different individual tasks corresponding to the different individual objectives of the problem utilizing different iterations of the population of the candidate set of possible assignments.

In block 370, the robots in the set are deployed into the confined geographic space. Thereafter, in block 380, the performance of each of the robots is surveilled to identify any robot appearing to be unable to complete its assigned task. In this regard, in decision block 390, it is determined if a given one of the robots is unable to complete a correspondingly assigned task. If so, in block 400 a substitute robot for the given one of the robots is identified as being able to complete the task unable to be completed by the given one of the robots. In block 410, task is then re-assigned to the substitute robot. Finally, in block 420, the locomotive model of the given one of the robots is modified to include one or more elements of the locomotive model of the substitute robot. In this way, the weaker performing robots in the set are trained according to the stronger performing robots in set so that the tasks of the problem may then be re-assigned more effectively to the robots in the set.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of teaming in swarm intelligent robot sets having stronger and weaker performing robots, the method comprising:

programming a multiplicity of robots in a multi-robot set with a particular locomotive model;

assigning each of the multiplicity of robots to different individual tasks corresponding to different individual objectives of a problem based upon the particular locomotive model of the corresponding robots;

deploying the multi-robot set into a confined geographic area;

surveilling each robot to ensure that each robot assigned to a corresponding one of the different tasks is achieving the assigned one of the tasks; and, responsive to one of the robots in the multi-robot set failing to complete a corresponding assigned one of the tasks, selecting a different one of the robots in the multi-robot set with a locomotive model considered compatible with the corresponding assigned one of the tasks to complete the corresponding assigned one of the tasks and assigning to the one of the robots failing to complete the corresponding assigned one of the tasks, a different task assigned to the different one of the robots and training weaker performing ones of the robots in the set by stronger performing ones of the robots in set so that tasks of the problem are re-assigned more effectively to the robots in the set.

2. The method of claim 1, further comprising modifying the locomotive model of the one of the robots with the locomotive model of the selected different one of the robots.

3. The method of claim 1, wherein the robots of the multi-robot set are communicatively linked to one another over a wireless computer communications network and each of the robots surveils at least one other of the robots in the multi-robot set to ensure that the surveilled other robot assigned to a corresponding one of the different tasks is achieving the assigned one of the tasks.

4. The method of claim 1, further comprising responding to one of the robots in the multi-robot set failing to complete a corresponding assigned one of the tasks by re-assigning each of the multiplicity of robots to the different individual tasks corresponding to the different individual objectives of a problem based upon the particular locomotive model of the corresponding robots and in consideration of the inability of the one of the robots in the multi-robot set failing to complete the corresponding assigned one of the tasks.

5. The method of claim 1, wherein each of the multiplicity of robots is assigned to different individual tasks corresponding to different individual objectives of a problem based upon the particular locomotive model of the corresponding robots utilizing a genetic algorithm in consideration of a population of a candidate set of possible assignments, and wherein ones of the multiplicity of robots are repeatedly re-assigned over time to other different individual tasks corresponding to the different individual objectives of the problem utilizing different iterations of the population of the candidate set of possible assignments.

6. A swarm robotics data processing system configured for teaming in swarm intelligent robot sets having stronger and weaker performing robots, the system comprising:
 a host computing platform comprising one or more computers each with memory and at least one processor;
 a multiplicity of robots in a multi-robot set deployed in a confined geographic area and in wireless communication with the host computing platform, each of the robots having at least one microprocessor, memory and a locomotive platform comprising one or more locomotive elements driven by a motor controlled by a controller coupled to the at least one microprocessor, each of the robots additionally including programming specifying a particular locomotive model defining a permissible range of movement of a corresponding one of the robots;
 a teaming module executing in memory of the host computing platform, the module comprising program code that assigns each of the multiplicity of robots to different individual tasks corresponding to different individual objectives of a problem based upon the particular locomotive model of the corresponding robots, surveils each robot to ensure that each robot assigned to a corresponding one of the different tasks is achieving the assigned one of the tasks and responds to one of the robots in the multi-robot set failing to complete a corresponding assigned one of the tasks by selecting a different one of the robots in the multi-robot set with a locomotive model considered compatible with the corresponding assigned one of the tasks to complete the corresponding assigned one of the tasks and assigning to the one of the robots failing to complete the corresponding assigned one of the tasks, a different task assigned to the different one of the robots and training weaker performing ones of the robots in the set by stronger performing ones of the robots in set so that tasks of the problem are re-assigned more effectively to the robots in the set.

7. The system of claim 6, wherein the program code of the teaming module further modifies the locomotive model of the one of the robots with the locomotive model of the selected different one of the robots.

8. The system of claim 6, wherein the robots of the multi-robot set are communicatively linked to one another over a wireless computer communications network and each of the robots surveils at least one other of the robots in the multi-robot set to ensure that the surveilled other robot assigned to a corresponding one of the different tasks is achieving the assigned one of the tasks.

9. The system of claim 6, wherein the program code of the teaming module is enabled to respond to one of the robots in the multi-robot set failing to complete a corresponding assigned one of the tasks by re-assigning each of the multiplicity of robots to the different individual tasks corresponding to the different individual objectives of a problem based upon the particular locomotive model of the corresponding robots and in consideration of the inability of the one of the robots in the multi-robot set failing to complete the corresponding assigned one of the tasks.

10. The system of claim 6, wherein each of the multiplicity of robots is assigned to different individual tasks corresponding to different individual objectives of a problem based upon the particular locomotive model of the corresponding robots utilizing a genetic algorithm in consideration of a population of a candidate set of possible assignments, and wherein ones of the multiplicity of robots are repeatedly re-assigned over time to other different individual tasks corresponding to the different individual objectives of the problem utilizing different iterations of the population of the candidate set of possible assignments.

11. A computer program product for teaming in swarm intelligent robot sets having stronger and weaker performing robots, the computer program product comprising a computer readable storage medium having program instructions embodied therewith, wherein the computer readable storage medium is not a transitory signal per se, the program instructions executable by a device to cause the device to perform a method comprising:
 programming a multiplicity of robots in a multi-robot set with a particular locomotive model;
 assigning each of the multiplicity of robots to different individual tasks corresponding to different individual objectives of a problem based upon the particular locomotive model of the corresponding robots;
 deploying the multi-robot set into a confined geographic area;
 surveilling each robot to ensure that each robot assigned to a corresponding one of the different tasks is achieving the assigned one of the tasks; and, responsive to one of the robots in the multi-robot set failing to complete a corresponding assigned one of the tasks, selecting a different one of the robots in the multi-robot set with a locomotive model considered compatible with the corresponding assigned one of the tasks to complete the corresponding assigned one of the tasks and assigning to the one of the robots failing to complete the corresponding assigned one of the tasks, a different task assigned to the different one of the robots and training weaker performing ones of the robots in the set by stronger performing ones of the robots in set so that tasks of the problem are re-assigned more effectively to the robots in the set.

12. The computer program product of claim 11, wherein the method further comprises modifying the locomotive model of the one of the robots with the locomotive model of the selected different one of the robots.

13. The computer program product of claim 11, wherein the robots of the multi-robot set are communicatively linked to one another over a wireless computer communications network and each of the robots surveils at least one other of the robots in the multi-robot set to ensure that the surveilled other robot assigned to a corresponding one of the different tasks is achieving the assigned one of the tasks.

14. The computer program product of claim 11, wherein the method further comprises responding to one of the robots in the multi-robot set failing to complete a corresponding assigned one of the tasks by re-assigning each of the multiplicity of robots to the different individual tasks corresponding to the different individual objectives of a problem based upon the particular locomotive model of the corresponding robots and in consideration of the inability of the one of the robots in the multi-robot set failing to complete the corresponding assigned one of the tasks.

15. The computer program product of claim 11, wherein each of the multiplicity of robots is assigned to different individual tasks corresponding to different individual objectives of a problem based upon the particular locomotive model of the corresponding robots utilizing a genetic algorithm in consideration of a population of a candidate set of possible assignments, and wherein ones of the multiplicity of robots are repeatedly re-assigned over time to other different individual tasks corresponding to the different individual objectives of the problem utilizing different iterations of the population of the candidate set of possible assignments.

* * * * *